United States Patent
Wagner

(10) Patent No.: US 6,857,685 B2
(45) Date of Patent: Feb. 22, 2005

(54) HARDTOP VEHICLE ROOF

(75) Inventor: Tobias Wagner, Hamburg (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/704,504

(22) Filed: Nov. 8, 2003

(65) Prior Publication Data
US 2004/0189039 A1 Sep. 30, 2004

Related U.S. Application Data

(63) Continuation-in-part of application No. PCT/EP03/03160, filed on Mar. 27, 2003.

(30) Foreign Application Priority Data

Apr. 26, 2002 (DE) .......................................... 102 18 874

(51) Int. Cl.[7] .................................................. B60J 7/00
(52) U.S. Cl. ................................................. 296/107.07
(58) Field of Search ...................... 296/107.07, 107.08, 296/107.17

(56) References Cited

U.S. PATENT DOCUMENTS

| 6,131,988 | A | * | 10/2000 | Queveau et al. | ....... 296/107.17 |
|---|---|---|---|---|---|
| 6,485,085 | B1 | * | 11/2002 | Pecho et al. | ........... 296/107.07 |
| 2001/0045759 | A1 | * | 11/2001 | Russke | .................. 296/107.17 |
| 2002/0149227 | A1 | * | 10/2002 | Wagner et al. | ......... 296/107.08 |
| 2002/0158485 | A1 | * | 10/2002 | Obendiek | .............. 296/107.07 |
| 2002/0171258 | A1 | * | 11/2002 | Obendiek | .............. 296/107.08 |
| 2002/0175536 | A1 | * | 11/2002 | Biecker et al. | ........ 296/107.07 |
| 2003/0085587 | A1 | * | 5/2003 | Reinsch | ................. 296/107.17 |

FOREIGN PATENT DOCUMENTS

| DE | 198 07 490 | 9/1999 |
|---|---|---|
| DE | 199 36 252 | 2/2001 |
| EP | 1 092 580 | 4/2001 |
| FR | 2 805 218 | 8/2001 |
| FR | 2 805 219 | 8/2001 |

* cited by examiner

*Primary Examiner*—Lori L. Coletta
(74) *Attorney, Agent, or Firm*—Klaus J. Bach

(57) ABSTRACT

In a hard top vehicle roof comprising front and rear roof parts movable by an operating mechanism between a closed position, in which the roof parts cover an interior vehicle space, and an open position, in which they are deposited in a rear vehicle storage compartment, the rear roof part includes a window supported on the rear roof part by a four link mechanism having two window links pivotally connected with one of their ends to the rear roof part and with their opposite ends to the rear window, and a control lever connected to the front roof part for controlling the movement of the rear window relative to the rear roof part during movement of the roof parts between the closed and the open positions.

6 Claims, 3 Drawing Sheets

HARDTOP VEHICLE ROOF

This is a Continuation-In-Part application of international application PCT/EP03/03160 filed Mar. 27, 2003 and claiming the priority of German application 102 18 874.2 filed Apr. 26, 2002.

BACKGROUND OF THE INVENTION

The invention relates to a removable hardtop vehicle roof comprising at least two roof parts, which are movable between a closed position, in which they cover an interior vehicle space, and a storage position, in which the roof parts are deposited in a rear storage compartment, and with a rear window supported in the rear roof part so as to be movable relative thereto.

DE 198 07 490 C1 discloses a two-part hardtop vehicle roof including front and rear roof parts, which are movable by an operating mechanism between a closed position, in which they cover an interior vehicle space, and an open or storage position, in which they are deposited in a rear storage compartment. The rear roof part includes a rear window, which is movable relative to the rear roof part. In the closed position of the vehicle roof, the rear window is sealingly disposed in an opening of the rear roof part. However, in the storage position, the rear window is pivoted relative to the rear roof part about a pivot shaft supported on the rear roof part such that the rear window is disposed in the storage compartment raised relative to the rear roof part in order to increase the available trunk space. The pivot axis between the rear window and the rear roof part is disposed in the rear area of the rear roof section.

By way of a control lever which, with one end thereof, is pivotally connected to the vehicle body and, with its other end, to the rear window, the rear window is forced upwardly during movement of the rear roof part into the storage compartment so that the rear window is raised with respect to the rear roof part in the storage compartment.

The relative movement between the rear window and the rear roof part however is solely a rotational pivot movement. As a result, the rear window is disposed in the storage compartment at an angle with respect to the plane of the rear roof part. The space made additionally available in the vehicle trunk therefore has the shape of an acute-angled sector so that the trunk space gained, particularly in the area next to the interior vehicle space, that is, the inner trunk wall, is relatively small.

FR 2 805 218 A1 and, respectively, FR 2 805 219 A1 disclose a two-part hardtop vehicle roof whose rear roof part includes side C-columns between which the rear view window is disposed when the roof is in the closed position. The rear window is pivotally connected at one end by way of a jointed lever, which is firmly mounted to the rear window, to the vehicle body and at its other end, it is pivotally supported on the C-columns by another jointed lever which includes two pivot joints. During movement of the vehicle roof into the storage compartment, the rear window moves in a circular path about the vehicle body-based pivot joint. The C-columns of the rear roof part are also pivotally supported on the vehicle body, the pivot joints between the C-columns and the rear window being spaced from each other. The different pivot movements of the rear window and the C-columns during movement of the roof into the storage compartment result in a relative movement of the rear window with respect to the C-columns, wherein the upper jointed lever positively controls the movement of the upper part of the rear window relative the C-columns.

In this vehicle roof, the rear window is pivotally supported by the vehicle body. As a result, the possibilities for depositing the window in the storage compartment are very limited. Particularly, it is impossible to make the movement of the roof parts upon movement into the storage compartment independent of the movement of the rear window into the storage compartment, since the rear roof part is connected to the vehicle body also by way of the rear window.

For further background information reference is made to EP 1 092 580 A1 and DE 199 36 252 A1.

It is the object of the present invention to provide a hardtop vehicle roof, which can be stored in the storage compartment in a space-saving manner so that additional trunk space is available in the vehicle trunk when the roof is deposited in the storage compartment.

SUMMARY OF THE INVENTION

In a hard vehicle roof comprising front and rear roof parts movable by an operating mechanism between a closed position, in which the roof parts cover an interior vehicle space, and an open position, in which they are deposited in a rear vehicle storage compartment, the rear roof part includes a window supported on the rear roof part by a four link mechanism having two window links pivotally connected with one of their ends to the rear roof part and with their opposite ends to the rear window, and a control lever connected to the front roof part for controlling the movement of the rear window relative to the rear roof part during movement of the roof parts between the closed and the open positions.

As a result, the storage space needed for the roof in the trunk of the vehicle is reduced and furthermore additional storage possibilities for the roof become available. The rear window can now be raised with respect to the roof in its entirety or, if desired, only partially so that all parts of the rear window can displaced in the storage position relative to the rear roof part. In contrast, in the prior art arrangements the rear window and the rear roof part are firmly interconnected in the area of the pivot joint by which the rear window is supported on the rear roof part. With the arrangement according to the invention, more adjustment and movement possibilities of the rear window relative to the rear roof part are provided than are available for the prior art arrangements.

The four-link operating mechanism comprises two links, each of which is pivotally connected with one end thereof to the rear roof part and, with the other end, to the rear window. In this way, a four-link operating mechanism is established by way of which a combined translational and rotational adjustment movement can be achieved. Basically, one four-link operating mechanism arranged at each side of the rear window is sufficient but an additional four-link or other operating mechanism may be provided. Two four-link operating mechanisms may then be arranged in the driving direction of the vehicle one behind the other.

By the geometry of the two links of the four-link operating mechanism, that is, the length and mounting locations of the links, the relative movement between the rear window and the rear roof part can be determined. It is for example possible that the two links have different lengths so that the rear window is disposed at an angle to the rear roof part when moved away from the rear roof part. It may be expedient in this connection if the front link is longer than the rear link so that the front part of the rear window is raised to a greater extent than the rear part of the window. Upon pivoting of the rear roof part during its transfer from the closed position to the storage position about a vehicle body-based pivot axis into the storage compartment, the outer roof edge of the rear roof part extends downwardly. At the same time the front part of the rear window faces to the rear of the vehicle when the window is deposited in the storage compartment and it is raised with respect to the plane of the rear roof part in the storage compartment.

However, it may be advantageous if both links have the same length so that the rear window and the rear roof parts are always parallel to each other.

The displacement movement of the rear window relative to the rear roof part is preferably positively guided by way of a control lever which, at one end, is pivotally connected to the front roof part and, at its other end, to the rear window and particularly to one of the two links connected to the rear window. The relative movement of the front roof part with respect to the rear roof part during the transfer between the closed and the storage position of the roof is transferred as a control movement by way of the control lever to the rear window so that no additional drive is needed for the displacement movement of the rear window relative to the rear roof part.

The invention and expedient embodiments thereof will be described below in greater detail on the basis of the accompanying drawings.

DESCRIPTION OF A PREFERRED EMBODIMENT

Figure 1:
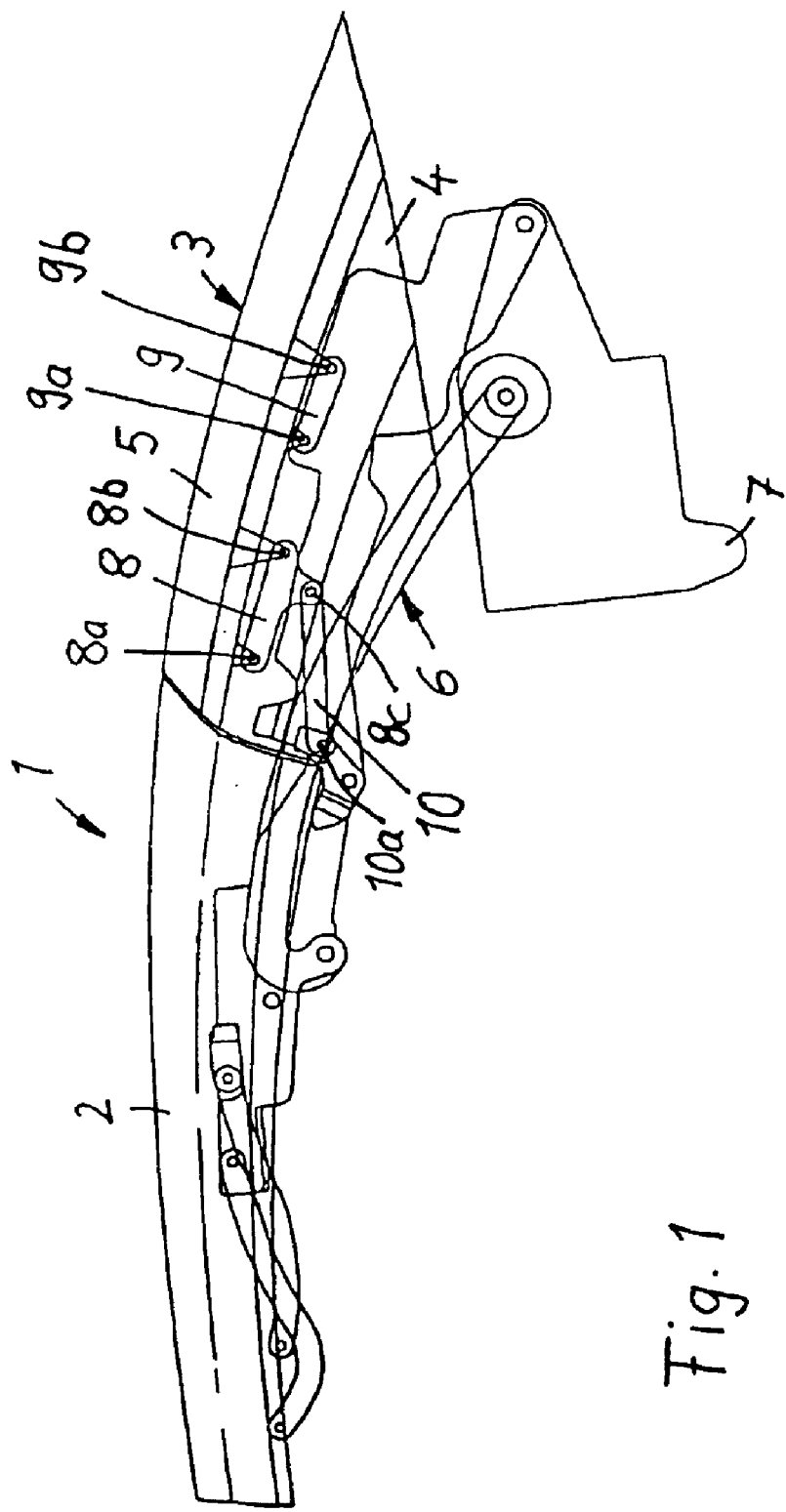
FIG. 1 is a side view of a two-part hardtop vehicle roof in the closed position in which the front roof part and the rear roof part are arranged one behind the other in a common roof plane and the rear window is disposed in a sealed position in the rear roof part.

In the figures, identical components are designated by the same reference numerals.

The hardtop vehicle roof 1 as shown in FIG. 1 includes a front roof part 2 and a rear roof part 3, which, in the closed position shown in FIG. 1, are arranged directly behind one another in the longitudinal vehicle direction and cover an interior vehicle space. Both roof parts 2 and 3 are in the form of rigid shells. The rear roof part 3 comprises side C-columns 4 and also a rear window 5, which, in the closed position of the roof, is engaged by the C-columns. The vehicle roof 1 is movable by an operating mechanism 6 between the closed position and a rear storage position. The operating mechanism 6 is pivotally supported on a console or, respectively a main support member 7.

The rear window 5 is supported on the rear roof part 3 so as to be movable between the closed sealed position as shown in FIG. 1 and a displacement position in which it is displaced with respect to the C-columns of the rear roof part 3. The rear window 5 is coupled to the rear roof part 3 by two links 8 and 9. The two links 8 and 9 are arranged in the longitudinal vehicle direction one behind the other and form a four-link operating mechanism, which executes a combined translatory and rotary adjustment motion of the rear vehicle roof 5 with respect to the rear roof part 3 or, respectively, the C-columns 4. The two links 8 and 9 are pivotally connected to the rear roof part 3 by front joints 8a and, respectively, 9a and to the rear window 5 by, in the longitudinal vehicle direction, rear joints 8b and respectively 9b. The two links 8 and 9 have different lengths, with the front link 8 being longer than the rear link 9. The two links 8 and 9 are spaced from each other, the distance therebetween corresponding about to the length of the rear link 9.

For controlling the displacement movement of the rear window 5 with respect to the rear roof part 3, a control lever 10 is provided which, at one end, is pivotally connected, by way of a joint 10a, to the front roof part 2 or a component which is firmly connected to the front roof part 2. Upon actuation of the operating mechanism for the transfer of the vehicle roof 1 between the closed position and the storage position, the relative position between the front roof part 2 and the rear roof part 3 is changed and this change is transmitted by way of the control lever 10 as control movement to the front link 8. This control movement positively initiates a movement of the rear window 5 relative to the rear roof part 3. The joint 8c, by way of which the control lever 10 is pivotally connected to the front link 8, is disposed between the outer joints 8a and 8b of the front link 8 but is displaced outwardly with respect to a connecting line between the joints 8a and 8b.

Figure 2:
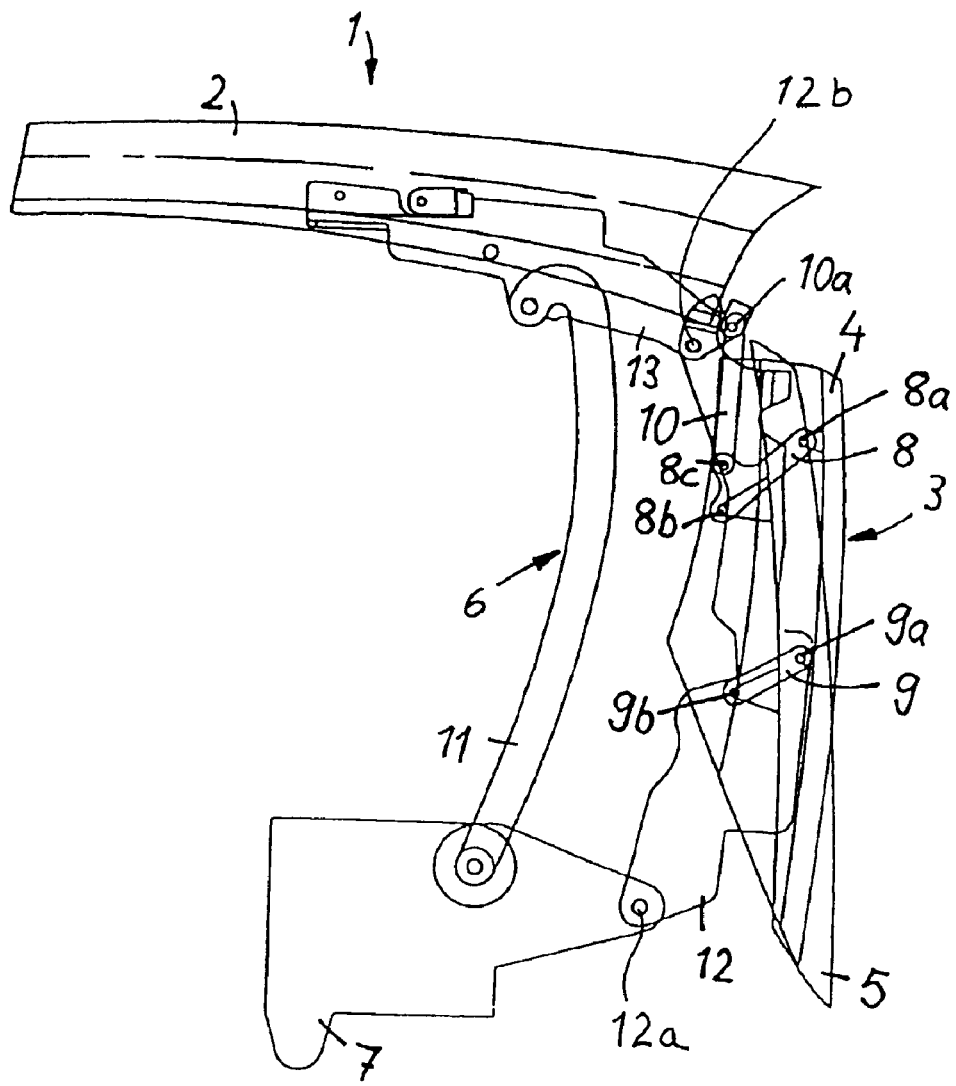
FIG. 2 shows the hardtop vehicle roof in a first intermediate position during the transfer from the closed to the storage position, wherein the rear window is displaced relative to the rear roof part.
Figure 3:
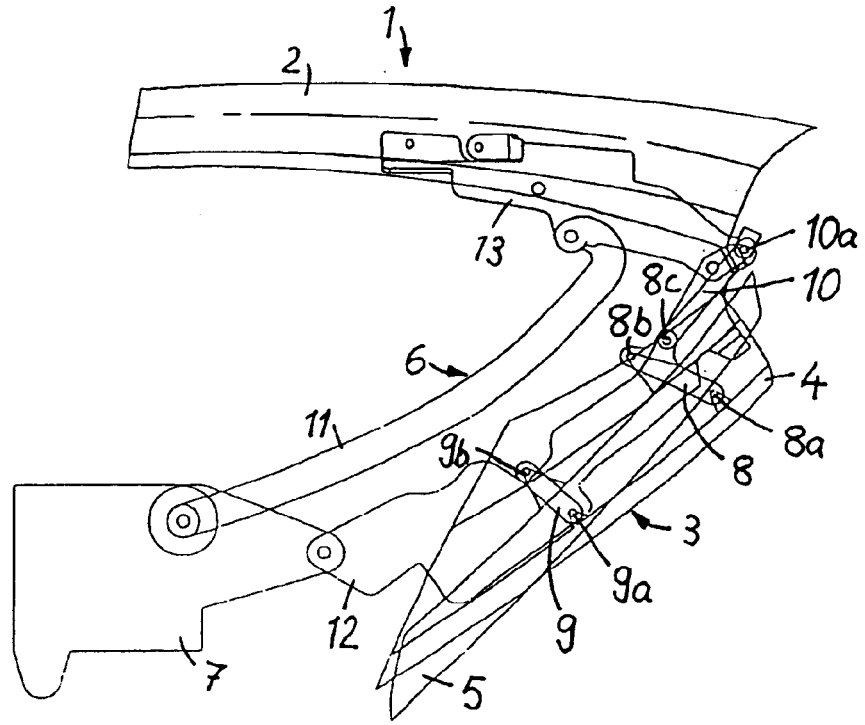
FIG. 3 shows the hardtop vehicle roof in a further advanced intermediate position.
Figure 4:
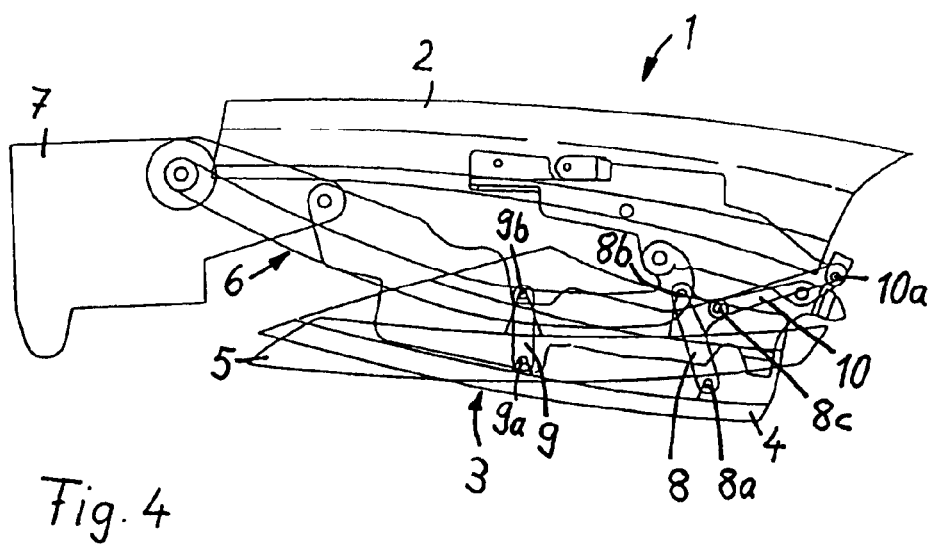
FIG. 4 shows the hardtop vehicle roof in its storage position.

As apparent from FIGS. 2 and 3, which show the vehicle roof 1 in intermediate positions, the vehicle roof 1 is pivoted during the transfer from the closed position to the storage position by the actuator-operated four-link operating mechanism 6 about two vehicle body-based pivot axes. The operating mechanism comprises two main links 11 and 12, which are each pivotally supported at one end thereof on the support structure 7 and at the other end pivotally connected to the front roof part 2. The rear main link 12 supports the rear roof part 3. Upon pivoting of the rear main link 12 about its vehicle body-based pivot axis 12a, the rear roof part 3 is pivoted rearwardly into the storage compartment so that the outer side of the rear roof part 3 faces downwardly in the storage position as shown in FIG. 4. The front roof part 2 is disposed in the storage compartment on top of the rear roof part 3 such that the outer side of the front roof part 2 faces upwardly.

The control lever 10, which is connected with one end to the front link 8 of the four-link operating mechanism for the rear window 5, is pivotally connected with its other end remote from the link 8 to the connecting arm 13 by way of the joint 10a. The connecting arm 13 is firmly mounted to the front roof part 2 to which the two main links 11 and 12 are pivotally connected. The joint 10a of the control lever 10 is disposed adjacent to, but spaced from, the pivot joint 12b of the main link 12 with the connecting arm 13.

Upon actuation of the operating mechanism 6 for transferring the vehicle roof from the closed to the storage position the relative positions of the front roof part 2 and the rear roof part 3 change as the two roof parts 2, 3 are moved from the position shown in FIG. 1, where they are disposed in a common roof plane, to a position in which they are angled relative to each other. This change of the relative position between the two roof parts is transferred to the front link 8 of the operating mechanism of the rear window 5 by way of the control lever 10, which is pivotally connected to the front roof part 2. Therefore, when the front link 8 executes a pivot movement about its joint 8a at the rear roof part 3 as well as about its joint 8b at the rear window 5, the relative position of the rear window 5 with respect to the rear roof part 3 is changed: The rear window is moved out of its closed position, in which it is sealingly engaged with the rear roof part, to a displacement position. The rear link 9 of the rear window operating mechanism executes a corresponding pivot movement about its joint 9a and 9b because of a kinematic coupling by way of the rear window or, respectively, an arm firmly connected to the rear window. The combination of the movements of the front link 8 and the rear link 9 results in a pivot movement of the rear window 5 with respect to the rear roof part 3 including a rotational and translational component. Depending on the selected geometries, particularly the length of the two links 8 and 9, the rear window may be displaced in the storage position of the vehicle roof as shown in FIG. 4 into a position parallel to, and displaced upwardly from, the rear roof part 3 or it may be displaced upwardly at an angle relative to the rear roof part 3. Because of the separation of the rear window from the rear roof part or, respectively, the C-columns, a seal can be provided which extends all around the window opening and firmly engages and seals the window in the closed position of the roof.

What is claimed is:

1. A hardtop vehicle roof comprising at least a front and a rear roof part, an operating mechanism supporting the roof parts so as to be movable between a closed position, in which the roof parts cover an interior vehicle space, and an open position, in which the roof is deposited in a rear storage compartment of the vehicle, said rear roof part including a rear window supported by a four-link mechanism so as to be movable relative to the rear roof part, said four-link mechanism including two window links pivotally connected with one of their ends to the rear roof part and being connected with their opposite ends pivotally to said rear window, said rear window being positively guided for movement relative to the rear roof part by a control lever pivotally connected with one end to the front roof part and with its other end facing the rear window to one of said two window links.

2. A hardtop vehicle roof according to claim 1, wherein said rear roof part is supported so as to be pivotable about a vehicle body-based pivot axis and, in its storage position, is disposed in the storage compartment with its top side facing downwardly, and said rear window is displaced from the rear roof part in the rear storage compartment in an upwardly spaced relationship to the rear roof part.

3. A hardtop vehicle roof according to claim 1, wherein said two window links (8, 9) are disposed in spaced relationship one behind the other in the longitudinal vehicle direction.

4. A hardtop vehicle roof according to claim 3, wherein said two window links (8, 9) have different lengths.

5. A hardtop vehicle roof according to claim 4, wherein the front link (8) is longer than the rear link (9).

6. A hardtop vehicle roof according to claim 1, wherein said front roof part (2) and said rear roof part (3) are connected to the vehicle body by way of a four-link operating mechanism (6).

* * * * *